United States Patent
Chen

(10) Patent No.: US 6,321,789 B1
(45) Date of Patent: Nov. 27, 2001

(54) TWO-STAGE WATER-SAVING STRUCTURE OF A FAUCET

(75) Inventor: Mei-Li Chen, Taichung Hsien (TW)

(73) Assignee: Kuching International Ltd. (TW)

(*) Notice: Subject to any disclaimer, the term of this patent is extended or adjusted under 35 U.S.C. 154(b) by 0 days.

(21) Appl. No.: 09/618,628

(22) Filed: Jul. 18, 2000

(51) Int. Cl.⁷ .......................... F16K 11/074; F16K 35/04
(52) U.S. Cl. .................................. 137/625.17; 137/625.4; 251/288; 251/297
(58) Field of Search ............................ 137/625.17, 625.4; 251/285, 288, 297

(56) References Cited

U.S. PATENT DOCUMENTS

| | | | |
|---|---|---|---|
| 4,733,688 | * | 3/1988 | Lorch ................................ 251/288 X |
| 5,490,540 | * | 2/1996 | Vom Dahl et al. ............. 137/625.17 |
| 5,522,429 | * | 6/1996 | Bechte et al. ................... 137/625.17 |
| 5,538,041 | * | 7/1996 | Ganzle ............................ 137/625.17 |
| 5,899,230 | * | 5/1999 | Orlandi ........................... 137/625.17 |
| 5,967,184 | * | 10/1999 | Chang ............................. 137/625.17 |
| 6,170,523 | * | 1/2001 | Chang ............................. 137/625.17 |

* cited by examiner

Primary Examiner—John Rivell
(74) Attorney, Agent, or Firm—Browdy and Neimark

(57) ABSTRACT

Two-stage water-saving structure of a faucet, including an inner switching/controlling valve assembly, a bar seat, a locating pin, a switching/controlling bar and a housing. The inner switching/controlling valve assembly is composed of several controlling valves. Two engaging hooks and two locating blocks are disposed on the bottom of the inner switching/controlling valve assembly. The top face of the inner switching/controlling valve assembly is formed with a water exit. The top face of the bar seat is formed with a central rectangular bar hole. Two inner lateral sides of the bottom of the bar hole of the bar seat are respectively disposed with two semicylindrical locating blocks. A lateral side of the bar seat is formed with a central pin hole. The bottom end of the switching/controlling bar is disposed with a downward extending semispherical switching/controlling head. A front and a rear faces of a lower section of the switching/controlling bar are formed with <-shaped stop faces. Two lateral sides of the bottom of the switching/controlling bar are respectively disposed with two slide blocks. The switching/controlling bar is formed with a central pivot hole. The top of the housing is formed with a bar hole. The bottom of the housing is formed with two hook slots and two locating recesses.

2 Claims, 3 Drawing Sheets

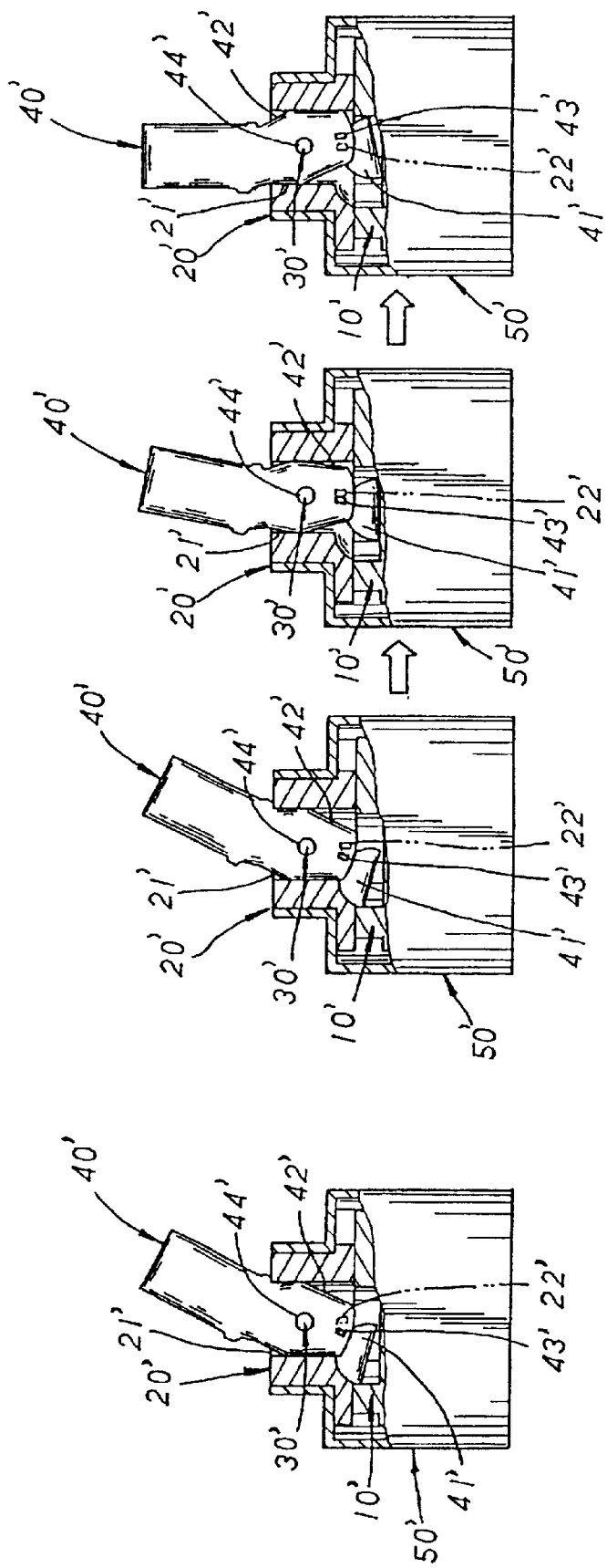

TWO-STAGE WATER-SAVING STRUCTURE OF A FAUCET

BACKGROUND OF THE INVENTION

The present invention relates to a two-stage water-saving structure of a faucet in which when the switching/controlling bar is shifted for opening the water exit, the switching/controlling bar is first halfway stopped by a certain stopping force to half-open the water exit. Therefore, the water exit is prevented from being opened to maximum extent at one time. Only in the case that larger amount of water is needed, a greater force can be exerted onto the switching/controlling bar to discharge larger amount of water as necessary. Therefore, the water can be saved.

FIG. 1 shows a conventional faucet structure which includes an inner switching/controlling valve assembly 10, a bar seat 20, a locating pin 30, a switching/controlling bar 40 and a housing 50. The inner switching/controlling valve assembly 10 is composed of several controlling valves. Two engaging hooks 11 are symmetrically disposed on two opposite sides of the bottom of the inner switching/controlling valve assembly 10. The other two opposite sides thereof are respectively disposed with two locating blocks 12. The top face of the bar seat 20 is formed with a central rectangular bar hole 21. A lateral side of the bar seat 20 is formed with a pin hole 22 passing through the bar hole 21. The switching/controlling bar 40 is a rectangular bar. The bottom end thereof is disposed with a downward extending semispherical switching/controlling head 41. The front and rear faces of the lower section of the switching/controlling bar 40 are formed with <-shaped stop faces 42 the middles of which outward protrude. A lateral side is formed with a pivot hole 43. The top of the housing 50 is formed with a bar hole 51. Two opposite sides of the bottom are symmetrically formed with two hook slots 52. The other two opposite sides are respectively symmetrically disposed with two locating recesses 53.

When assembled, as shown in FIG. 2, the switching/controlling bar 40 is first placed into the bar hole 21 of the bar seat 20. Then the locating pin 30 is passed through the pin hole 22 of the bar seat 20 and the pivot hole 43 of the switching/controlling bar 40 so as to pivotally locate the switching/controlling bar 40 in the bar hole 21 of the bar seat 20. Then the bottom face of the bar seat 20 is attached to the top face of the inner switching/controlling valve assembly 10 with the switching/controlling head 41 fitted in the water exit of the inner switching/controlling valve assembly 10. Then the assembly is received in the housing 50 with the switching/controlling bar 40 passing through the bar hole 51 of the housing 50. Also, the locating blocks 12 of the inner switching/controlling valve assembly 10 are engaged in the locating recesses 53 of the housing 50 and the engaging hooks 11 are hooked in the hook slots 52.

In use, as shown in FIG. 2, when the switching/controlling bar 40 is shifted up and down, the switching/controlling head 41 thereof controls the extent to which the water exit of the inner switching/controlling valve assembly 10 is opened. The upper the switching/controlling bar 40 is shifted, the more the water exit is opened and the more the discharged water is. When the <-shaped stop faces 42 of the lower section of the switching/controlling bar 40 abut against the inner wall face of the bar hole 21 of the bar seat 20, maximum amount of water is discharged or the water is shut off.

The above conventional structure has some shortcomings as follows:

When shifting the switching/controlling bar 40, the amount of the discharged water can be adjusted. However, the switching/controlling bar 40 can be so easily shifted that the switching/controlling bar 40 is often directly shifted to the maximum amount, especially by a child. This results in great waste of water resource.

SUMMARY OF THE INVENTION

It is therefore a primary object of the present invention to provide a two-stage water-saving structure of a faucet in which when the switching/controlling bar is shifted to one half of its travel, the slide blocks of the switching/controlling bar will be stopped by the locating blocks of the bar seat with a certain stopping force. Therefore, the switching/controlling bar is stopped halfway to prevent the water exit from being opened to maximum extent at one time. Therefore, the water can be saved.

The present invention can be best understood through the following description and accompanying drawings wherein:

BRIEF DESCRIPTION OF THE DRAWINGS

FIG. 4 is a sectional assembled view of the present invention; and

FIGS. 5A to 5C show the switching/controlling operation of the present invention.

DETAILED DESCRIPTION OF THE PREFERRED EMBODIMENT

Figure 1:
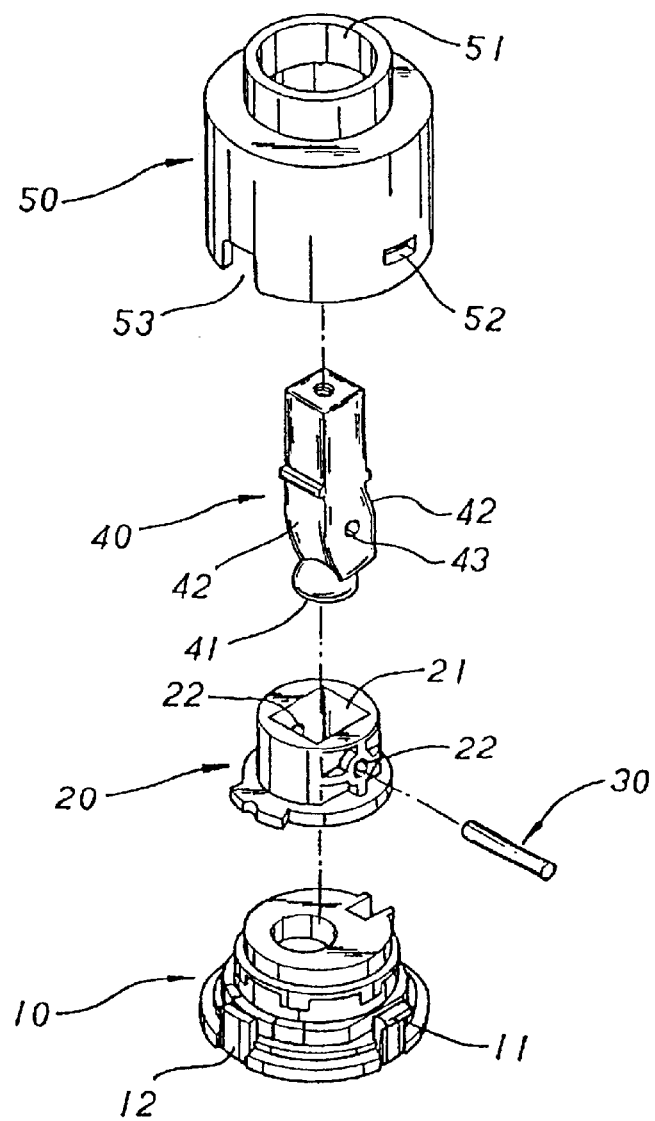
FIG. 1 is a perspective exploded view of a conventional faucet.
Figure 2:
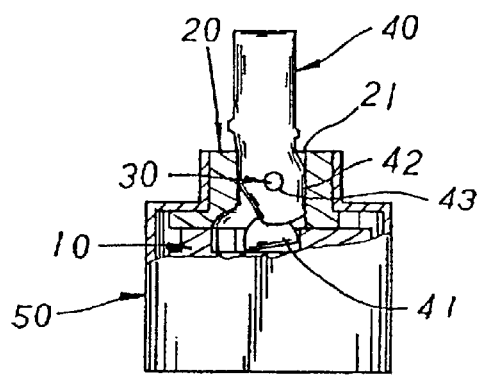
FIG. 2 is a sectional assembled view of the conventional faucet.
Figure 3:
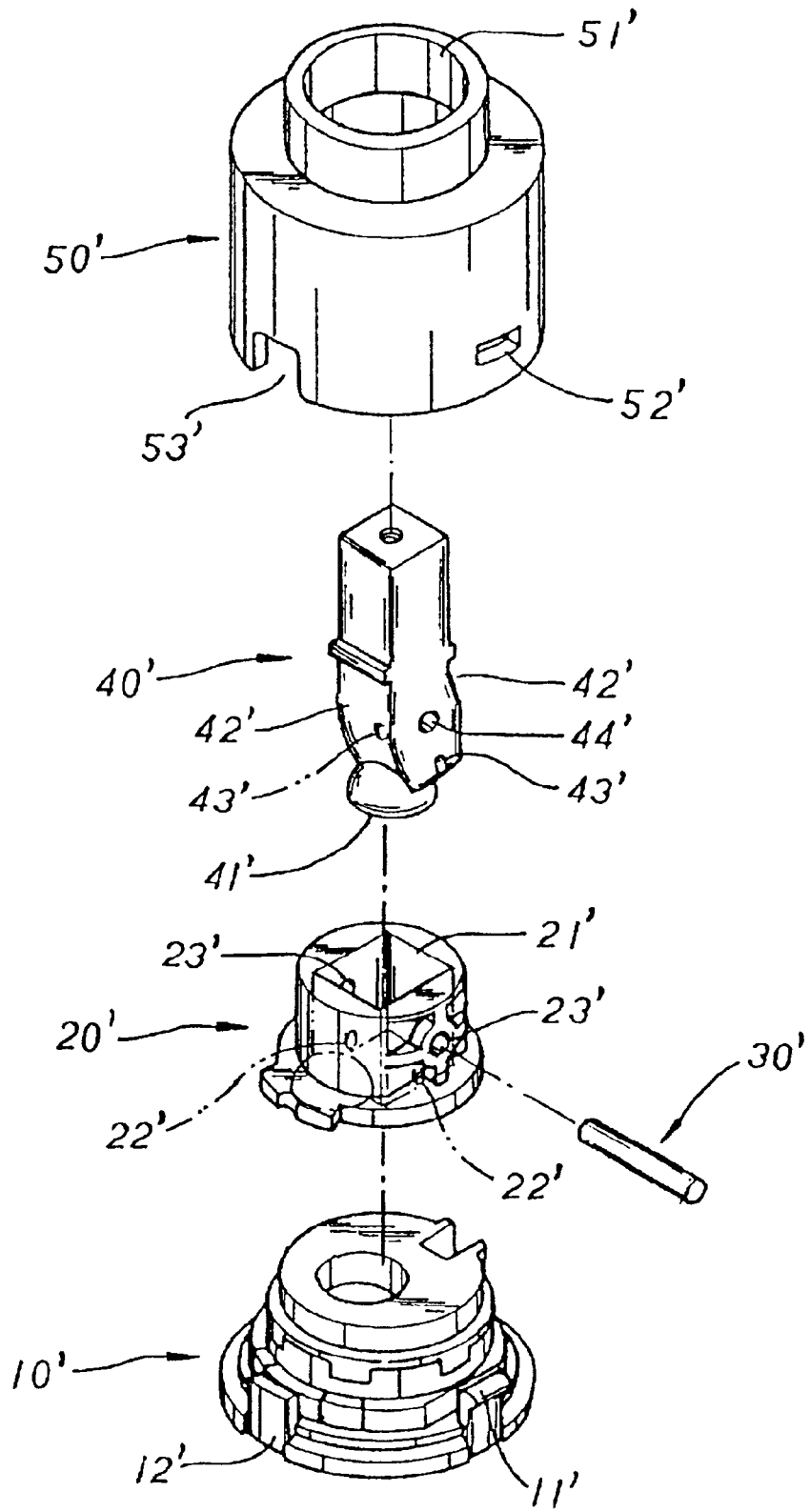
FIG. 3 is a perspective exploded view of the present invention.

Please refer to FIG. 3. The two-stage water-saving structure of a faucet of the present invention includes an inner switching/controlling valve assembly 10', a bar seat 20', a locating pin 30', a switching/controlling bar 40' and a housing 50'. The inner switching/controlling valve assembly 10' is composed of several controlling valves. Two engaging hooks 11' are symmetrically disposed on two opposite sides of the bottom of the inner switching/controlling valve assembly 10'. The other two opposite sides thereof are respectively disposed with two locating blocks 12'. The top face of the bar seat 20' is formed with a central rectangular bar hole 21'. Two inner lateral sides of the bottom of the bar hole 21' are respectively disposed with two semicylindrical locating blocks 22'. A lateral side of the bar seat 20' is formed with a central pin hole 23' passing through the bar hole 21'. The switching/controlling bar 40' is a rectangular bar. The bottom end thereof is disposed with a downward extending semispherical switching/controlling head 41'. The front and rear faces of the lower section of the switching/controlling bar 40 are formed with <-shaped stop faces 42' the middles of which outward protrude. Two lateral sides of the bottom of the switching/controlling bar 40' are respectively disposed with two semicylindrical slide blocks 43'. The switching/controlling bar 40' is formed with a central pivot hole 44'. The top of the housing 50 is formed with a bar hole 51'. Two opposite sides of the bottom are symmetrically formed with two hook slots 52'. The other two opposite sides are respectively symmetrically disposed with two locating recesses 53'.

When assembled, as shown in FIG. 4,, the switching/controlling bar 40' is first placed into the bar hole 21' of the bar seat 20'. Then the locating pin 30' is passed through the pin hole 23' of the bar seat 20' and the pivot hole 44' of the switching/controlling bar 40' so as to pivotally locate the switching/controlling bar 40' in the bar hole 21' of the bar seat 20'. Then the bottom face of the bar seat 20' is attached to the top face of the inner switching/controlling valve assembly 10'. Then the assembly is received in the housing 50' with the switching/controlling bar. passing the bar hole 51' of the housing 50'. Also, the locating blocks 12' of the inner switching/controlling valve assembly 10' are engaged in the locating recesses 53' of the housing 50' and the engaging hooks 11' are hooked in the hook slots 52'.

In use, as shown in FIG. 5, when the switching/controlling bar 40' is shifted up and down, the switching/controlling head 41' thereof controls the extent to which the water exit of the inner switching/controlling valve assembly 10' is opened. The upper the switching/controlling bar 40' is shifted, the more the discharged water is. However, when the switching/controlling bar 40' is shifted to one half of its travel, the slide blocks 43' of two sides of the bottom end of the switching/controlling bar 40' are stopped by the locating blocks 22' of two inner sides of the bottom of the rectangular bar hole 21' of the bar seat 20' so that the switching/controlling bar 40' is prevented from further moving downward. At this time, the water exit is half-opened. In the case that larger amount of water is needed, a greater force is exerted onto the switching/controlling bar 40' to make the slide blocks 43' of the switching/controlling bar 40' slide over the locating blocks 22' of the bar seat 20'. Under such circumstance, a larger amount of water is discharged.

The present invention has the following advantage:

When the switching/controlling bar 40' is shifted to one half of its travel, the slide blocks 43' of two sides of the bottom end of the switching/controlling bar 40' will be stopped by the locating blocks 22' of the bar seat 20'. Therefore, the switching/controlling bar 40' is stopped halfway to prevent the water exit from being opened to maximum extent at one time. Therefore, the water can be saved.

The above embodiment is only used to illustrate the present invention, not intended to limit the scope thereof. Many modifications of the above embodiment can be made without departing from the spirit of the present invention.

What is claimed is:

1. Two-stage water-saving structure of a faucet, comprising an inner switching/controlling valve assembly, a bar seat, a locating pin, a switching/controlling bar and a housing, the inner switching/controlling valve assembly being composed of several controlling valves, two engaging hooks being symmetrically disposed on two opposite sides of a bottom of the inner switching/controlling valve assembly, the other two opposite sides thereof being respectively disposed with two locating blocks, a top face of the inner switching/controlling valve assembly being formed with a water exit, a top face of the bar seat being formed with a central rectangular bar hole, a lateral side of the bar seat being formed with a central pin hole passing through the bar hole, the switching/controlling bar being a rectangular bar, a bottom end thereof being disposed with a downward extending semispherical switching/controlling head, a front and a rear faces of a lower section of the switching/controlling bar being formed with <-shaped stop faces the middles of which outward protrude, the switching/controlling bar being formed with a central pivot hole, a top of the housing being formed with a bar hole, two opposite sides of a bottom of the housing being symmetrically formed with two hook slots, the other two opposite sides of the bottom of the housing being respectively symmetrically disposed with two locating recesses, said two-stage water-saving structure being characterized in that two inner lateral sides of the bottom of the bar hole of the bar seat being respectively disposed with two locating blocks and two lateral sides of the bottom of the switching/controlling bar are respectively disposed with two slide blocks, whereby when the switching/controlling bar is pivotally located on the bar seat via the locating pin, the locating blocks of the bar seat and the slide blocks of the switching/controlling bar are positioned on the same rotational arch line.

2. Two-stage water-saving structure of a faucet as claimed in claim 1, wherein he locating blocks of the bar seat and the slide blocks of the switching/controlling bar are semicylindrical.

* * * * *